US011336206B2

(12) United States Patent
Cui et al.

(10) Patent No.: US 11,336,206 B2
(45) Date of Patent: May 17, 2022

(54) SWITCHING FREQUENCY AND PWM CONTROL TO EXTEND POWER CONVERTER LIFETIME

(71) Applicant: Rockwell Automation Technologies, Inc., Mayfield Heights, OH (US)

(72) Inventors: Yujia Cui, Cedarburg, WI (US); Garron K. Morris, Whitefish Bay, WI (US); Lixiang Wei, Mequon, WI (US)

(73) Assignee: Rockwell Automation Technoligies, Inc., Mayfield Heights, OH (US)

(*) Notice: Subject to any disclaimer, the term of this patent is extended or adjusted under 35 U.S.C. 154(b) by 0 days.

(21) Appl. No.: 17/029,874

(22) Filed: Sep. 23, 2020

(65) Prior Publication Data

US 2022/0094259 A1   Mar. 24, 2022

(51) Int. Cl.
  *H02M 7/5387* (2007.01)
  *H02M 1/088* (2006.01)
  *H02M 5/458* (2006.01)
  *H02P 27/08* (2006.01)

(52) U.S. Cl.
  CPC ....... *H02M 7/53876* (2021.05); *H02M 1/088* (2013.01); *H02M 5/4585* (2013.01); *H02P 27/08* (2013.01)

(58) Field of Classification Search
  CPC . H02M 1/088; H02M 7/53871–53876; H02M 5/4585; H02P 27/08; H02P 6/001
  See application file for complete search history.

(56) References Cited

U.S. PATENT DOCUMENTS

| | | | |
|---|---|---|---|
| 4,926,104 A | 5/1990 | King et al. | |
| 5,287,288 A * | 2/1994 | Brennen | H02J 3/01 363/54 |
| 5,623,219 A | 4/1997 | Karraker | |
| 5,847,536 A | 12/1998 | Miyazaki et al. | |
| 5,847,943 A | 12/1998 | Vogel | |

(Continued)

OTHER PUBLICATIONS

Wu et al., "Power Factor Control of a Three-Phase Boost Rectifier with Specific Power Factor Under Asymmetrical Conditions", 2005 IEEE Industry Applications Conf. $40^{th}$ IAS Annual Meeting, Oct. 2-6, 2005, Kowloon, Hong Kong, CN (IEEE Cat., vol. 1, Oct. 2, 2005, pp. 161-169.

(Continued)

*Primary Examiner* — Yusef A Ahmed
(74) *Attorney, Agent, or Firm* — Fay Sharpe LLP

(57) ABSTRACT

Methods, non-transitory computer readable mediums, and power conversion systems with a controller configured to provide modulated inverter switching control signals at a first switching frequency in response to an inverter current being greater than a first threshold and less than a second threshold, the second threshold being greater than the first threshold. The controller is further configured to provide the inverter switching control signals at a second switching frequency in response to the inverter current being greater than the second threshold, and to provide the inverter switching control signals at a third switching frequency in response to the inverter current being less than the first threshold, where the second switching frequency is less than the first switching frequency and the third switching frequency is greater than the first switching frequency.

20 Claims, 3 Drawing Sheets

(56) References Cited

U.S. PATENT DOCUMENTS

| | | |
|---|---|---|
| 5,936,856 A | 8/1999 | Xiang |
| 6,023,417 A | 2/2000 | Hava et al. |
| 6,185,115 B1 | 2/2001 | Sul et al. |
| 6,233,396 B1 | 5/2001 | Kuwada et al. |
| 6,617,819 B2 | 9/2003 | Dohmae et al. |
| 6,704,212 B2 | 3/2004 | Furukawa et al. |
| 6,710,564 B2 | 3/2004 | Shibuya et al. |
| 6,728,647 B1* | 4/2004 | Sivasubramaniam ............... G01R 27/2605 702/65 |
| 6,847,532 B2 | 1/2005 | Villaret |
| 7,034,501 B1 | 4/2006 | Thunes et al. |
| 7,049,778 B2 | 5/2006 | Katanaya |
| 7,102,327 B2 | 9/2006 | Ho |
| 7,141,943 B2 | 11/2006 | Song et al. |
| 7,176,652 B2 | 2/2007 | Wakabayashi et al. |
| 7,187,155 B2 | 3/2007 | Matsuo et al. |
| 7,190,143 B2 | 3/2007 | Wei et al. |
| 7,190,599 B2 | 3/2007 | Virolainen et al. |
| 7,265,954 B2 | 9/2007 | Hikawa et al. |
| 7,391,181 B2 | 6/2008 | Welchko et al. |
| 7,400,518 B2 | 7/2008 | Yin et al. |
| 7,471,526 B2 | 12/2008 | Welchko et al. |
| 7,495,938 B2 | 2/2009 | Wu et al. |
| 7,629,764 B2 | 12/2009 | Shoemaker et al. |
| 7,649,756 B2 | 1/2010 | Kerkman et al. |
| 7,679,310 B2 | 3/2010 | Schulz et al. |
| 7,732,267 B2 | 6/2010 | Jeoung et al. |
| 7,738,267 B1 | 6/2010 | Tallam et al. |
| 7,759,897 B2 | 7/2010 | Piippo |
| 7,825,621 B2 | 11/2010 | Wei et al. |
| 7,834,574 B2 | 11/2010 | West et al. |
| 7,881,081 B1 | 2/2011 | Tallam et al. |
| 8,054,032 B2 | 11/2011 | Chakrabarti et al. |
| 8,107,267 B2 | 1/2012 | Tallam et al. |
| 8,427,123 B2 | 4/2013 | Dearborn |
| 9,048,755 B2 | 6/2015 | Wei et al. |
| 9,054,586 B2 | 6/2015 | Wei et al. |
| 9,236,828 B1 | 1/2016 | Wei et al. |
| 9,318,976 B1 | 4/2016 | Wei et al. |
| 9,438,160 B2* | 9/2016 | Yamada ............... B60L 15/20 |
| 9,490,690 B2 | 11/2016 | Bhandarkar et al. |
| 9,753,067 B2 | 9/2017 | Deng |
| 9,800,134 B2 | 10/2017 | Patel et al. |
| 9,869,722 B1 | 1/2018 | Morris |
| 10,158,299 B1 | 12/2018 | Wei et al. |
| 10,250,179 B2* | 4/2019 | Suzuki ............... H02P 29/50 |
| 10,541,626 B1* | 1/2020 | Lamb ............... H02M 7/53873 |
| 10,601,343 B1* | 3/2020 | Lamb ............... H02P 27/08 |
| 10,715,056 B2* | 7/2020 | Liu ............... H03H 7/0115 |
| 10,952,299 B1* | 3/2021 | Xiong ............... H02M 3/33569 |
| 2004/0195995 A1 | 10/2004 | Quirion et al. |
| 2005/0068001 A1* | 3/2005 | Skaug ............... H02M 7/53873 318/807 |
| 2005/0215221 A1* | 9/2005 | Fujita ............... H03L 7/18 455/260 |
| 2006/0067092 A1 | 3/2006 | Nondahl et al. |
| 2006/0071734 A1* | 4/2006 | McCorquodale ...... H03B 5/124 331/176 |
| 2006/0267542 A1* | 11/2006 | Wei ............... H02M 7/219 318/807 |
| 2006/0290312 A1 | 12/2006 | Nagai et al. |
| 2007/0268728 A1 | 11/2007 | Mohan et al. |
| 2008/0088385 A1 | 4/2008 | Gizara |
| 2009/0109713 A1 | 4/2009 | Schnetzka et al. |
| 2009/0279336 A1* | 11/2009 | Erdman ............... H02J 3/383 363/131 |
| 2010/0165674 A1* | 7/2010 | Dai ............... H02M 7/53873 363/37 |
| 2010/0172161 A1 | 7/2010 | Tallam et al. |
| 2011/0012544 A1 | 1/2011 | Schulz et al. |
| 2011/0141774 A1 | 6/2011 | Kane et al. |
| 2011/0286244 A1* | 11/2011 | Wei ............... H02M 7/537 363/17 |
| 2011/0299308 A1* | 12/2011 | Cheng ............... H02M 5/4585 363/37 |
| 2012/0033470 A1 | 2/2012 | Muneshima et al. |
| 2012/0075892 A1 | 3/2012 | Tallam et al. |
| 2012/0112674 A1 | 5/2012 | Schulz et al. |
| 2012/0140532 A1 | 6/2012 | Tallam et al. |
| 2012/0201056 A1 | 8/2012 | Wei et al. |
| 2012/0256580 A1* | 10/2012 | Yu ............... H02P 1/28 318/779 |
| 2013/0154697 A1* | 6/2013 | Katsushi ............... H03L 7/0893 327/157 |
| 2013/0301311 A1* | 11/2013 | Wang ............... H02M 3/33507 363/21.13 |
| 2014/0070755 A1* | 3/2014 | Baek ............... H02P 27/085 318/798 |
| 2014/0197765 A1* | 7/2014 | Kim ............... H02P 29/50 318/400.2 |
| 2014/0268954 A1* | 9/2014 | Wei ............... H02M 7/219 363/89 |
| 2014/0297131 A1 | 10/2014 | Kahima |
| 2015/0077025 A1 | 3/2015 | Suzuki |
| 2015/0155804 A1* | 6/2015 | Sakai ............... H02P 6/28 318/400.27 |
| 2015/0180382 A1* | 6/2015 | Hamada ............... H02P 6/28 318/722 |
| 2016/0006367 A1* | 1/2016 | Wei ............... H02M 7/537 363/131 |
| 2016/0013715 A1* | 1/2016 | Patel ............... H02M 1/126 363/44 |
| 2017/0302209 A1 | 10/2017 | Royak et al. |
| 2017/0353138 A1* | 12/2017 | Zhang ............... H02P 27/06 |
| 2018/0034402 A1 | 2/2018 | Yoshimura et al. |
| 2018/0062443 A1* | 3/2018 | Cho ............... H02J 7/04 |
| 2019/0006935 A1* | 1/2019 | Wang ............... H02M 3/33507 |
| 2021/0167702 A1* | 6/2021 | Saha ............... H02P 25/16 |
| 2021/0257948 A1* | 8/2021 | Toyodome ............ H02P 27/08 |
| 2021/0352775 A1* | 11/2021 | Seong ............... H02M 7/53871 |

OTHER PUBLICATIONS

Hava, et al., "A High Performance Generalized Discontinuous PWM Algorithm", IEEE Applied Power Electronics Conference, Feb. 1997, vol. 2, pp. 886-891, IEEE Trans. on Industry Applications Version.

Sutar et al., "Performance Analysis of Z-Source Inverter Fed Induction Motor Drive", Int'l Journal of Scientific & Engineering Research, vol. 3, Issue 5, May 2012, pp. 1-6.

Y00 et al., "Third Harmonic Injection Circuit to Eliminate Electrolytic Capacitors in Light-Emitting Diode Drivers", Journal of Electrical Engineering & Technology, vol. 7, No. 3, pp. 358-365, 2012.

Younis et al., "High Efficiency THIPWM Three-Phase Inverter for Grid Connected System", 2010 IEEE Symposium on Industrial Electronics and Applications (ISIEA 2010), Oct. 3-5, 2010, Penang, Malaysia, pp. 88-93.

Younis et al., "Simulation of Grid Connected THIPWM-Three-Phase Inverter Using SIMULINK", 2011 IEEE Symposium on Industrial Electronics and Applications (ISIEA2011), Sep. 25-28, 2011, Langkawi, Malaysia, pp. 133-137.

Jiang et al., "Variable Switching Frequency PWM for Three-Phase Converter for Loss and EMI Improvement", Conference Record of APEC, Oct. 2012, pp. 1576-1583.

\* cited by examiner

SWITCHING FREQUENCY AND PWM CONTROL TO EXTEND POWER CONVERTER LIFETIME

BACKGROUND INFORMATION

The subject matter disclosed herein relates to power converters and extending the lifetime thereof.

BRIEF DESCRIPTION

Methods, non-transitory computer readable mediums, and power conversion systems with a controller configured to provide modulated inverter switching control signals at a first switching frequency in response to an inverter current being greater than a first threshold and less than a second threshold, the second threshold being greater than the first threshold. The controller is further configured to provide the inverter switching control signals at a second switching frequency in response to the inverter current being greater than the second threshold, and to provide the inverter switching control signals at a third switching frequency in response to the inverter current being less than the first threshold, where the second switching frequency is less than the first switching frequency and the third switching frequency is greater than the first switching frequency.

DETAILED DESCRIPTION

Figure 1:
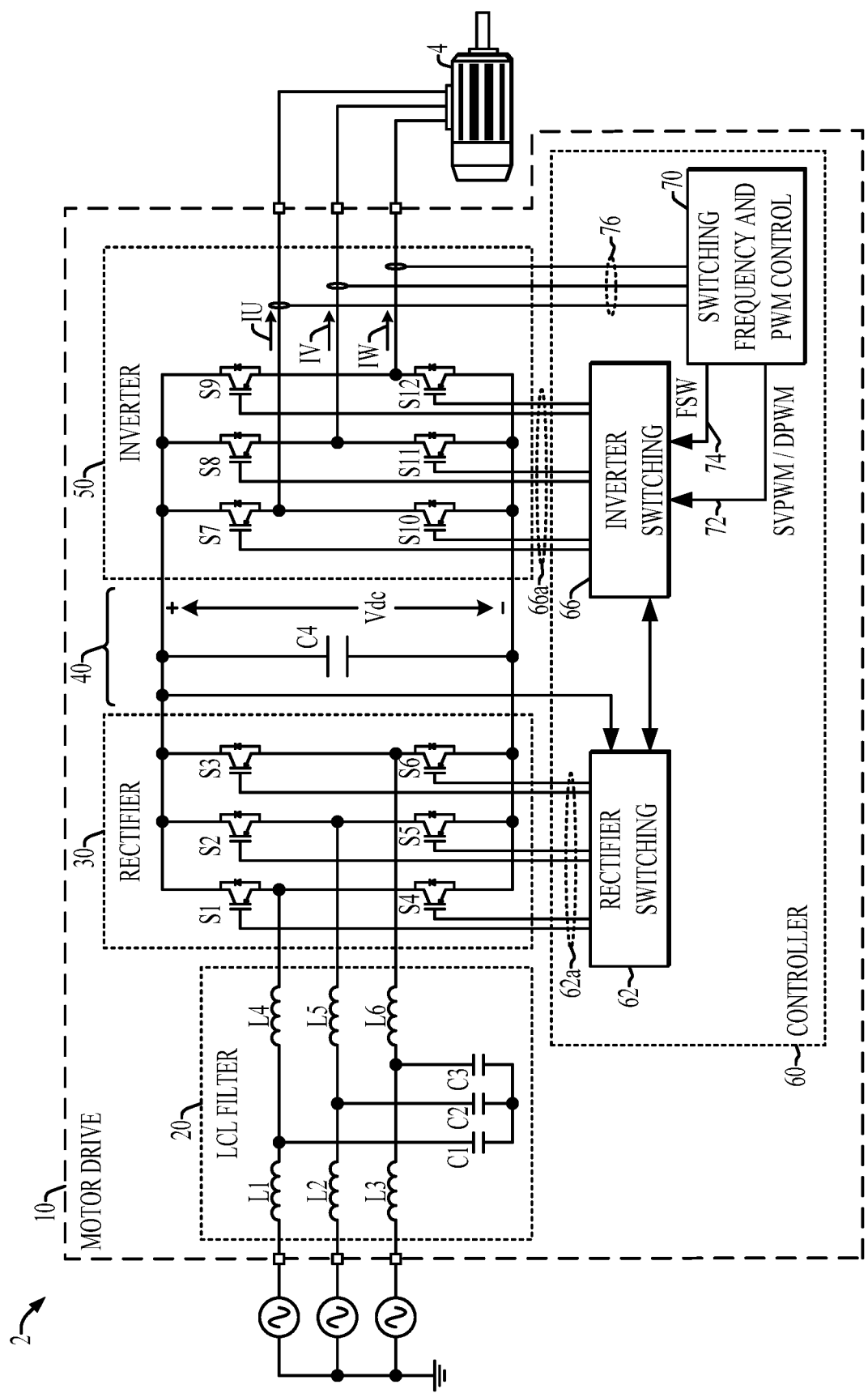
FIG. 1 is a schematic diagram of a motor drive power conversion system with selective space vector pulse width modulation or discontinuous pulse width modulation (SVPWM/DPWM) inverter operation and switching frequency adjustment to mitigate IGBT switching loss and extend system service life in accordance with one or more aspects of the present disclosure.

Referring now to the figures, several embodiments or implementations are hereinafter described in conjunction with the drawings, wherein like reference numerals are used to refer to like elements throughout, and wherein the various features are not necessarily drawn to scale. Power converters and associated operating configurations and methodologies are presented hereinafter for extending system lifetime by control of inverter switching frequency and/or inverter PWM technique, in which different inverter PWM switching frequencies are used for different output current loading levels. While these concepts are illustrated and described in the context of AC motor drives, they may be employed with other forms of power conversion systems, and the present disclosure is not limited to the illustrated examples.

Motor drives and other power conversion systems use inverter switches to convert DC input power to provide AC output power to drive a load. One type of inverter switch is an insulated-gate bipolar transistor (IGBT). Other types include silicon, gallium nitride, silicon carbide, or other field effect transistors (FETs). Inverter switches are turned on and off at relatively high frequencies by pulse width modulated (PWM) switching control signals. During the on state, the motor drive inverter switches experience conduction losses associated with the on-state resistance (e.g., drain-source on-state resistance or RDSON) and the current and voltages of a given design. Conduction loss is generally fixed and determined by load profile. Switching losses occur when the inverter switch transitions between the on state and the off state.

Described examples use selective switching frequency adjustment and/or selective application of different PWM switching techniques to adjust switching loss. In certain examples, the adjustment or adjustments are done by a power converter controller in generating the inverter switching control signals such that the change in inverter switch case temperature is reduced, to thereby extend the system lifetime. Failure of an IGBT or other inverter switch type is an important factor in determining or estimating power converter product lifetime. Manufactured switch devices, such as IGBTs have multiple important failure modes that occur at different time scales (e.g., second or minutes), including bond wire cracking/lift-off that is caused by power cycling over several seconds, as well as die-attach solder failure that is mainly caused by thermal cycling and changes in the device case temperature Tc over minutes. Disclosed examples reduce inverter switch device case temperature variation ΔTc, and thereby improve (e.g., lengthen) the lifetime of the power conversion system. In certain implementations, even slight reduction of ΔTc can considerably increase the inverter switch module lifetime.

FIG. 1 shows an example motor drive power conversion system or power converter 10. The power conversion system 10 receives single or multiphase AC input power from an external power source 2. The illustrated example receives a three-phase input, but single phase or other multiphase embodiments are possible. The power conversion system 10 includes an input filter circuit 20, in this case a three phase LCL filter having grid side inductors L1, L2 and L3 connected to the power leads of the power source 2 as well as series connected converter side inductors L4, L5 and L6. The filter circuit 20 further includes filter capacitors C1, C2 and C3 connected between the corresponding grid and converter side inductors and a common connection node, which may but need not be connected to a system ground. Other alternate input filter circuit configurations can be used, including without limitation LC filters. The power conversion system 10 also includes a rectifier 30 (also revered to as a converter) with rectifier switching devices S1-S6, a DC bus or DC link circuit 40 with a DC bus capacitor C4, and an output inverter 50 with inverter switching devices S7-S12. In another implementation, a passive rectifier is used, having rectifier diodes or SCRs (not shown) to rectifier input AC power to provide a DC bus signal $V_{dc}$ across the DC bus capacitor C4. In another example, the rectifier 20 is external to the drive 10, and the system 10 includes DC input terminals for connection to an external active or passive rectifier (not shown) to receive DC input power to operate the output inverter 50. In one example, that the inverter 50 is connected with a DC source for S7-S12 IGBT thermal cycling improvement.

A controller 60 operates the rectifier 30 and the inverter 50 via a rectifier controller 62 and an inverter controller 66, respectively. The controller 60 also includes a switching frequency and PWM control component 70 that controls a switching frequency FSW of the inverter 50 according to a current associated with the power conversion system, such as the inverter output currents provided to the motor load 4. The switching frequency and PWM control component 70 in one example is a firmware or software component with instructions stored in a memory of the controller 60 and executed by a processor of the controller 60. The switching frequency and PWM control component 70 has a first output 72 that provides a PWM mode control signal SVPWM/DPWM having one of two possible states that control the PWM mode implemented by the inverter controller 66, for example, to selectively implement space vector pulse width modulation (SVPWM) in generating inverter switching control signals 66a or to implement discontinuous pulse width modulation (DPWM) in generating the inverter switching control signals 66a. The switching frequency and PWM control component 70 has a second output 74 that provides a selected switching frequency FSW signal that is used by the inverter controller 66 to generate the modulated inverter switching control signals 66a to operate the switches S7-S12 of the inverter 50.

In one example, the controller 60 and the components 62, 66 and 70 thereof are implemented as any suitable hardware, processor-executed software, processor-executed firmware, logic, and/or combinations thereof. The controller 60 can be implemented largely in processor-executed software or firmware providing various control functions by which the controller 60 receives feedback and/or input signals and/or values (e.g., setpoint(s)) and provides rectifier and inverter switching control signals 62a and 66a to operate the respective rectifier switching devices S1-S6 and the inverter switching devices S7-S12 to convert input power for providing AC output power to drive the load 4. In one example, the controller 60 and the components thereof are implemented in a single processor-based device, such as a microprocessor, microcontroller, FPGA, etc. In another example, or one or more of these are separately implemented in unitary or distributed fashion by two or more processor devices of the power conversion system 100. The controller 60 receives various input signals or values, including setpoint signals or values for desired output operation, such as motor speed, position, torque, etc., as well as feedback signals or values representing operational values of various portions of the power conversion system 10. Among these are a DC bus voltage feedback signal or value representing the DC bus voltage $V_{dc}$.

The example power conversion system 10 of FIG. 1 implements an active front end (AFE) including a switching rectifier (also referred to as a converter) 30 that receives three-phase power from the source 2 through the filter circuit 20. The rectifier 30 includes the ROCKWELL rectifier switches S1-S6, which may be insulated gate bipolar transistors (IGBTs) or other suitable form of semiconductor-based switching devices operable according to a corresponding rectifier switching control signal 62a to selectively conduct current when actuated. Operation of the rectifier switches S1-S6 is controlled according to pulse width modulated rectifier switching control signals 62a from the rectifier controller 62 to provide active rectification of the AC input power from the source 2 to provide the DC bus voltage $V_{dc}$ across the DC bus capacitor C4 in the DC link circuit 40.

The inverter switching devices S7-S12 are coupled to receive power from the DC bus 40 and to provide AC output power to the motor load 4. The inverter switching devices S7-S12 are operated according to the inverter switching control signals 66a from the inverter controller 66, and can be any form of suitable high-speed switching devices, including without limitation IGBTs, FETs, etc. The inverter switching controller 66 provides the modulated inverter switching control signals 66a to operate the output inverter 50 according to a desired output for driving the motor load 4, for example, including one or more open and/or closed loop regulators or controllers (e.g., PID or PI control components), such as to control a motor rotor position, speed, torque or combinations thereof. The switching frequency and PWM control component 70 in one example operates according to one or more motor operation setpoints, and one or more feedback signals or values. In one example, the switching frequency and PWM control component 70 selectively determines one or both of the PWM mode control signal SVPWM/DPWM and the selected switching frequency FSW signal according to one or more feedback signals or values 76 that indicate an inverter current or currents associated with the inverter 50.

In one example, the controller 60 receives one or more feedback signals or values associated with the inverter output currents IU, IV and IW individually associated with a corresponding one of the three output phases. The controller 60 computes an average or mean inverter current IMEAN as the average of one or more rms phase output currents IUrms, IVrms, IWrms of the inverter 50 based on the output current feedback signals or values. The inverter switching devices S7-S12 are coupled to receive DC input power and to provide AC output power to drive a load 4. The controller 60 is configured to provide modulated inverter switching control signals 66a to operate the inverter switching devices S7-S12 at a selected switching frequency FSW to provide the AC output power according to the inverter current IMEAN. In this example, the controller 60 is configured to control the inverter switches S7-S12 according to the PWM mode and switching frequency inputs SVPWM/DPWM and FSW from the switching frequency and PWM control component 70.

The switching frequency and PWM control component 70 compares the computed inverter current IMEAN in each control cycle with non-zero first and second thresholds TH1 and TH2, respectively, where the second threshold TH2 is greater than the first threshold TH1. In one example, the first threshold TH1 is less than 0.3 times a rated current of the power conversion system 10, such as 0.2 times the rated current in one implementation. In this or another example, the second threshold TH2 is greater than 0.8 times the rated current of the power conversion system 10, such as 1.0 times the rated current in one implementation. In one example, one or both of the thresholds TH1 and/or TH2 is or are user configurable. Based on the comparison and transitions of the inverter current IMEAN and the thresholds TH1 and TH2, the switching frequency and PWM control component 70 generates the PWM mode control signal SVPWM/DPWM at the first output 72 and generates the switching frequency output signal FSW at the output 74. In response to the SVPWM/DPWM and FSW signals, the inverter controller 66 provides the modulated inverter switching control signals 66a to operate the inverter switching devices S7-S12.

In operation of one example, the controller 60 provides the modulated inverter switching control signals 66a at a non-zero first switching frequency F0 in response to the inverter current IMEAN being greater than the first threshold TH1 and less than the second threshold TH2. In this example, the controller 60 provides the modulated inverter switching control signals 66a at a non-zero second switching frequency FL in response to the inverter current IMEAN being greater than the second threshold TH2, where the second switching frequency FL is less than the first switching frequency F0. The controller 60 in this example also provides the modulated inverter switching control signals 66a at a non-zero third switching frequency FH in response to the inverter current IMEAN being less than the first threshold TH1, where the third switching frequency FH is greater than the first switching frequency F0. In one example, the second switching frequency FL is less than 2 kHz, such as about 1.33 kHz in one implementation. In this or another example, the third switching frequency FH is greater than 3 kHz, such as about 4.00 kHz in one implementation. In one example, one, some or all of the switching frequencies F0, FL and/or FH are user configurable.

In one example, the controller 60 implements a non-zero amount of hysteresis in the relative values of the thresholds TH1 and TH2 to provide more stable inverter output control. In one implementation, the controller 60 transitions the switching frequency FSW of the inverter 50 from the third switching frequency FH to the first switching frequency F0 in response to the inverter current IMEAN transitioning above the first threshold TH1, and transitions the switching frequency FSW of the inverter 50 from the first switching frequency F0 to the second switching frequency FL in response to the inverter current IMEAN transitioning above the second threshold TH2. In this example, the controller 60 transitions the switching frequency FSW of the inverter 50 from the second switching frequency FL to the first switching frequency F0 in response to the inverter current IMEAN transitioning below the second threshold TH2, and transitions the switching frequency FSW of the inverter 50 from the first switching frequency F0 to the third switching frequency FH in response to the inverter current IMEAN transitioning below the first threshold TH1.

The controller 60 in one example also or separately implements selective mode switching between SVPWM and DPWM modes according to the PWM mode control signal SVPWM/DPWM at the first output 72 of the switching frequency and PWM control component 70. The controller 60 in these examples selectively provides the modulated inverter control signals 66a using SVPWM in response to the inverter current IMEAN being less than the second threshold TH2, and selectively provides the modulated inverter control signals 66a using DPWM in response to the inverter current IMEAN being greater than the second threshold TH2. The selective SVPWM or DPWM mode operation in one example can be allowed (e.g., activated or enabled) by a user setting in initial or subsequent configuration of the power conversion system 100, and when not allowed, the controller 60 implements SVPWM for the entire output current range with selective switching frequency adjustment according to IMEAN and the thresholds TH1 and TH2. In certain examples, moreover, the controller 60 implements N selectable switching frequencies FSW with N−1 thresholds and N current ranges, where N is an integer that is greater than or equal to 3.

Figure 2:
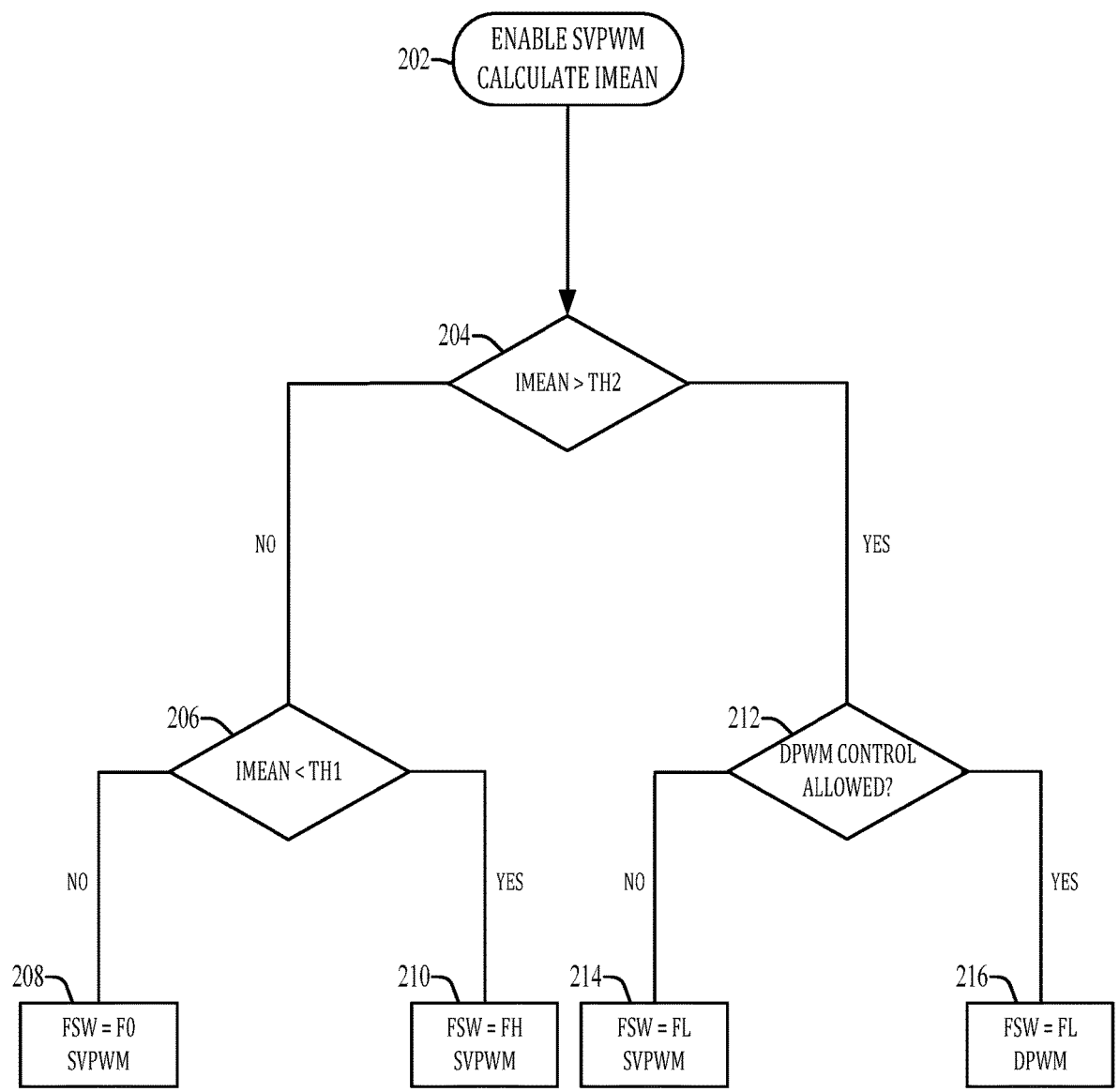
FIG. 2 is a flow diagram of a method of operating a power conversion system according to further aspects of the disclosure.
Figure 3:
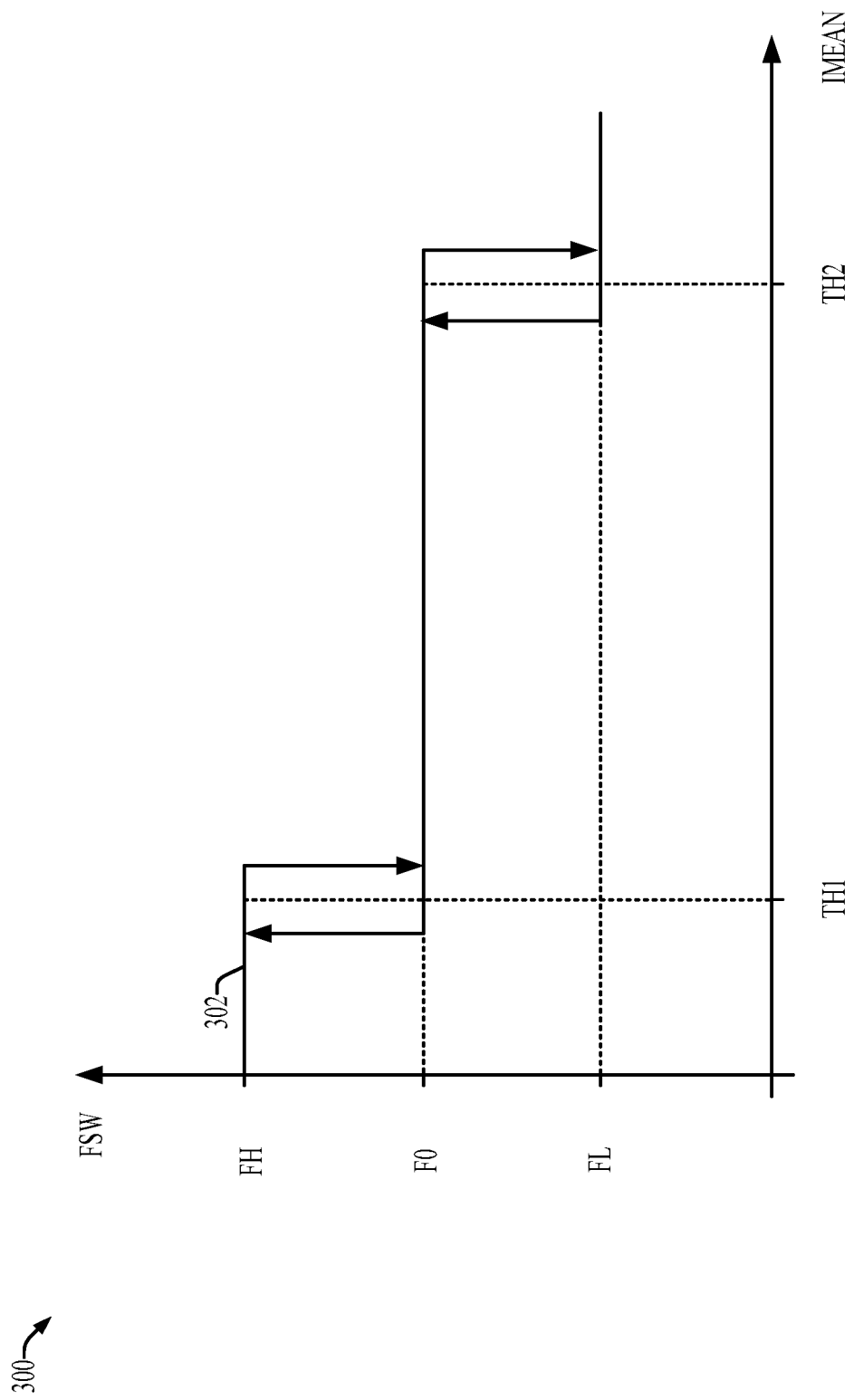
FIG. 3 is a signal diagram showing modulation switching frequency control in the power conversion system of FIG. 1.

Referring also to FIGS. 2 and 3, FIG. 2 shows an example method 200 of operating a power conversion system, and FIG. 3 shows switching frequency control in the power conversion system 10 of FIG. 1. In one example, the controller 60 of FIG. 1 implements the method 200 of FIG. 2. The controller 60 and the example method 200 facilitate extension of the product lifetime of a motor drive or other power conversion system 10 by reducing inverter switching loss through changing PWM scheme (e.g., SVPWM or DPWM) and/or adjusting the inverter switching frequency FSW. In operation, the switching frequency and/or PWM mode adjustment in certain examples lowers the inverter switching device case temperature variation $\Delta T_c$ and extends the inverter switch lifetime, whether IGBTs, FETs or other semiconductor based switching devices S7-S12 are used in the inverter 50. For an IGBT switching device example, the switching loss and device case temperature are related, where the IGBT conduction loss $P_{lc}$ is approximated as follows:

$$P_{lc} = \frac{I_o^2}{8} + \frac{V_{ce0}}{2\pi} + \frac{V_{ce0} \cdot I_o \cdot M \cdot \cos(\emptyset)}{8} + \frac{I_o^2 \cdot R_{ce} \cdot M \cdot \cos(\emptyset)}{3\pi}$$

The IGBT switching loss $P_{sc}$ is approximated as follows:

$$P_{ls} = \frac{f_{sw} \cdot E_{onoff}}{\pi} \cdot \frac{V_{DC} \cdot I_o}{V_{nom} \cdot I_{nom}}$$

In addition, the respective diode conduction and switching losses $P_{Dc}$ and $P_{Dc}$ for the antiparallel diodes of the inverter 50 are given as follows:

$$P_{Dc} = \frac{I_o^2 \cdot R_d}{8} + \frac{V_F \cdot I_o}{2\pi} - \frac{V_F \cdot I_o \cdot M \cdot \cos(\emptyset)}{8} - \frac{I_o^2 \cdot R_d \cdot M \cdot \cos(\emptyset)}{3\pi}$$

$$P_{Ds} = \frac{f_{sw} \cdot E_{rec}}{\pi} \cdot \frac{V_{DC} \cdot I_o}{V_{nom} \cdot I_{nom}}$$

The IGBT case temperature $P_{sc}$ is given as follows:

$T_c = T_{amb} + T_{ha} + T_{ch}$;

Where: $T_{ha} = 6 \cdot (P_{lc} + P_{ls} + P_{Dc} + P_{Ds}) \cdot Z_{ha}$;

$Z_{ha}(t) = R_{ha} \cdot (1 - e^{-t/\tau_{ha}})$;

$T_{ch} = (P_{lc} + P_{ls}) \cdot Z_{ch}$;

$Z_{ch}(t) = R_{ch} \cdot (1 - e^{-t/\tau_{ch}})$.

The method 200 can be implemented in each control cycle of the inverter 50 to reduce the inverter switching device case temperature variation $\Delta T_c$ and extend the service lifetime of the power conversion system 10. The method 200 begins at 202 with the controller 60 selectively enabling the SVPWM operation and computing the inverter output current IMEAN according to one or more feedback signals or values (e.g., IMEAN=AVG(IUrms, IVrms, IWrms)).

At 204, the controller 60 determines whether the average inverter output current IMEAN is greater than TH2. If not (NO at 204), the controller 60 determines whether the average inverter output current IMEAN is less than TH1 at 206. If not (NO at 206), the switching frequency and PWM control component 70 sets the PWM mode to SVPWM and the switching frequency FSW to F0 at 208 for the current control cycle. If the average inverter output current IMEAN is less than TH1 (e.g., YES at 206), the switching frequency and PWM control component 70 again sets the PWM mode to SVPWM and sets the switching frequency FSW to FH at 210 for the current control cycle.

If the average inverter output current IMEAN is greater than TH2 (YES at 204 in FIG. 2), the controller 60 determines at 212 whether the selective DPWM operating mode is allowed (e.g., according to user setup or configuration of the power conversion system 100). If not (NO at 212), the switching frequency and PWM control component 70 sets or keeps the PWM mode to SVPWM and sets the switching frequency FSW to FL at 214. Otherwise, if DPWM operation is allowed (YES at 212), the switching frequency and PWM control component 70 sets the PWM mode to DPWM and sets the switching frequency FSW to FL at 216.

In this implementation, the method 200 includes providing the modulated inverter switching control signals 66a at 208 at the first switching frequency F0 to operate inverter switching devices S7-S12 of an inverter 50 in response to an inverter current IMEAN being greater than TH1 and less than TH2, as well as providing the inverter switching control signals 66a at 210 at FL in response to the inverter current IMEAN being greater than TH2, and providing the inverter switching control signals 66a at 214 and 216 at FH in response to the inverter current IMEAN being less than TH1.

Referring also to FIG. 3, in one implementation, the method 200 also implements non-zero hysteresis around the thresholds TH1 and TH2. FIG. 3 shows a diagram 300 with an example inverter switching frequency curve 302 (FSW) showing hysteretic transitions implemented by the controller 60 according to the method 200. This example includes transitioning the switching frequency FSW from FH to F0 in response to the inverter current IMEAN transitioning above the first threshold TH1 (e.g., at 204 and 206), as well as by transitioning FSW from F0 to FL in response to IMEAN transitioning above TH2 (e.g., at 204 and 212).

In this example, the method 200 also includes transitioning the switching frequency FSW from FL to F0 (e.g., at 204 and 206) in response to IMEAN transitioning below TH2, and transitioning FSW from F0 to FH (e.g., at 204 and 206) in response to the inverter current IMEAN transitioning below the first threshold TH1. Moreover, certain implementations of the method 200 also selectively provide the inverter control signals 66a using SVPWM (e.g., at 208, and 210) in response to IMEAN being less than TH2, and selectively providing the inverter control signals 66a at 216 using DPWM in response to IMEAN being greater than TH2. In one example implementation, as discussed previously, the first threshold TH1 is less than 0.3 times the rated current of the power conversion system 10 (e.g., 0.2 times Irated), and the second threshold TH2 is greater than 0.8 times the rated current of the power conversion system 10 (e.g., TH2=Irated).

In accordance with further aspects of the present disclosure, a non-transitory computer readable medium is provided, such as a computer memory, a memory within a power converter control system (e.g., controller 60), a CD-ROM, floppy disk, flash drive, database, server, computer, etc.), which includes computer executable instructions for performing the above-described methods.

Various embodiments have been described with reference to the accompanying drawings. Modifications and changes may be made thereto, and additional embodiments may be implemented, without departing from the broader scope of the invention as set forth in the claims that follow. The specification and drawings are accordingly to be regarded in an illustrative rather than restrictive sense. The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
an inverter, comprising a plurality of inverter switching devices coupled to receive DC input power and to provide AC output power to drive a load; and
a controller configured to provide modulated inverter switching control signals to operate the inverter switching devices at a switching frequency to provide the AC output power according to an inverter current, the controller configured to:
provide the modulated inverter switching control signals at a non-zero first switching frequency in response to the inverter current being greater than a non-zero first threshold and less than a non-zero second threshold, the second threshold being greater than the first threshold,
provide the modulated inverter switching control signals at a non-zero second switching frequency in response to the inverter current being greater than the second threshold, the second switching frequency being less than the first switching frequency, and
provide the modulated inverter switching control signals at a non-zero third switching frequency in response to the inverter current being less than the first threshold, the third switching frequency being greater than the first switching frequency.

2. The power conversion system of claim 1, wherein the controller is configured to:
transition the switching frequency of the inverter from the third switching frequency to the first switching frequency in response to the inverter current transitioning above the first threshold;
transition the switching frequency of the inverter from the first switching frequency to the second switching frequency in response to the inverter current transitioning above the second threshold;
transition the switching frequency of the inverter from the second switching frequency to the first switching frequency in response to the inverter current transitioning below the second threshold; and
transition the switching frequency of the inverter from the first switching frequency to the third switching frequency in response to the inverter current transitioning below the first threshold.

3. The power conversion system of claim 2, wherein the controller is configured to:
selectively provide the modulated inverter switching control signals using space vector pulse width modulation in response to the inverter current being less than the second threshold; and
selectively provide the modulated inverter switching control signals using discontinuous pulse width modulation in response to the inverter current being greater than the second threshold.

4. The power conversion system of claim 3, wherein: the second switching frequency is less than 2 kHz; and the third switching frequency is greater than 3 kHz.

5. The power conversion system of claim 3, wherein the first threshold is less than 0.3 times a rated current of the power conversion system.

6. The power conversion system of claim 3, wherein the second threshold is greater than 0.8 times a rated current of the power conversion system.

7. The power conversion system of claim 3, wherein: the first threshold is less than 0.3 times a rated current of the power conversion system; and the second threshold is greater than 0.8 times the rated current of the power conversion system.

8. The power conversion system of claim 1, wherein the controller is configured to:
selectively provide the modulated inverter switching control signals using space vector pulse width modulation in response to the inverter current being less than the second threshold; and
selectively provide the modulated inverter switching control signals using discontinuous pulse width modulation in response to the inverter current being greater than the second threshold.

9. The power conversion system of claim 8, wherein: the second switching frequency is less than 2 kHz; and the third switching frequency is greater than 3 kHz.

10. The power conversion system of claim 1, wherein: the second switching frequency is less than 2 kHz; and the third switching frequency is greater than 3 kHz.

11. The power conversion system of claim 10, wherein: the first threshold is less than 0.3 times a rated current of the power conversion system.

12. The power conversion system of claim 1, wherein the first threshold is less than 0.3 times a rated current of the power conversion system.

13. The power conversion system of claim 1, wherein the inverter current is an average of one or more rms phase output currents of the inverter.

14. The power conversion system of claim 1, wherein one of the first threshold, the second threshold, the first switching frequency, the second switching frequency and the third switching frequency is user configurable.

15. A method for operating a power conversion system, the method comprising:
providing modulated inverter switching control signals at a non-zero first switching frequency to operate inverter switching devices of an inverter in response to an inverter current being greater than a non-zero first threshold and less than a non-zero second threshold, the second threshold being greater than the first threshold;
providing the modulated inverter switching control signals at a non-zero second switching frequency in response to the inverter current being greater than the second threshold, the second switching frequency being less than the first switching frequency; and
providing the modulated inverter switching control signals at a non-zero third switching frequency in response to the inverter current being less than the first threshold, the third switching frequency being greater than the first switching frequency.

16. The method of claim 15, further comprising:
transitioning the switching frequency of the inverter from the third switching frequency to the first switching frequency in response to the inverter current transitioning above the first threshold;
transitioning the switching frequency of the inverter from the first switching frequency to the second switching frequency in response to the inverter current transitioning above the second threshold;
transitioning the switching frequency of the inverter from the second switching frequency to the first switching frequency in response to the inverter current transitioning below the second threshold; and
transitioning the switching frequency of the inverter from the first switching frequency to the third switching frequency in response to the inverter current transitioning below the first threshold.

17. The method of claim 15, further comprising:
selectively providing the modulated inverter switching control signals using space vector pulse width modulation (SVPWM) in response to the inverter current being less than the second threshold; and
selectively providing the modulated inverter switching control signals using discontinuous pulse width modulation (DPWM) in response to the inverter current being greater than the second threshold.

18. The method of claim 15, wherein: the first threshold is less than 0.3 times a rated current of the power conversion system; and the second threshold is greater than 0.8 times the rated current of the power conversion system.

19. A non-transitory computer readable medium having computer executable instructions, which, when executed by a processor, cause the processor to:
provide modulated inverter switching control signals at a non-zero first switching frequency to operate inverter switching devices of an inverter in response to an inverter current being greater than a non-zero first threshold and less than a non-zero second threshold, the second threshold being greater than the first threshold;
provide the modulated inverter switching control signals at a non-zero second switching frequency in response to the inverter current being greater than the second threshold, the second switching frequency being less than the first switching frequency; and
provide the modulated inverter switching control signals at a non-zero third switching frequency in response to the inverter current being less than the first threshold, the third switching frequency being greater than the first switching frequency.

20. The non-transitory computer readable medium of claim 19, having further computer executable instructions, which, when executed by theft processor, cause the processor to:
transition the switching frequency of the inverter from the third switching frequency to the first switching frequency in response to the inverter current transitioning above the first threshold;
transition the switching frequency of the inverter from the first switching frequency to the second switching frequency in response to the inverter current transitioning above the second threshold;
transition the switching frequency of the inverter from the second switching frequency to the first switching frequency in response to the inverter current transitioning below the second threshold; and
transition the switching frequency of the inverter from the first switching frequency to the third switching frequency in response to the inverter current transitioning below the first threshold.

* * * * *